Jan. 12, 1965     D. D. RAZE     3,164,899
COMPRESSION TYPE TOOL
Filed July 11, 1961
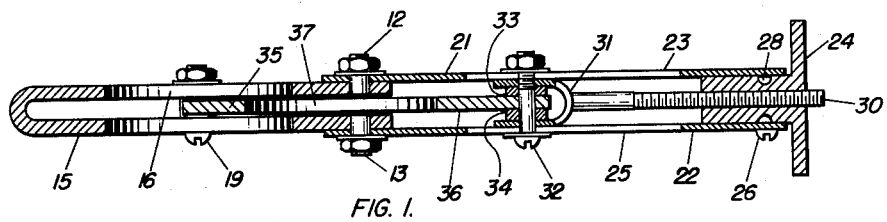
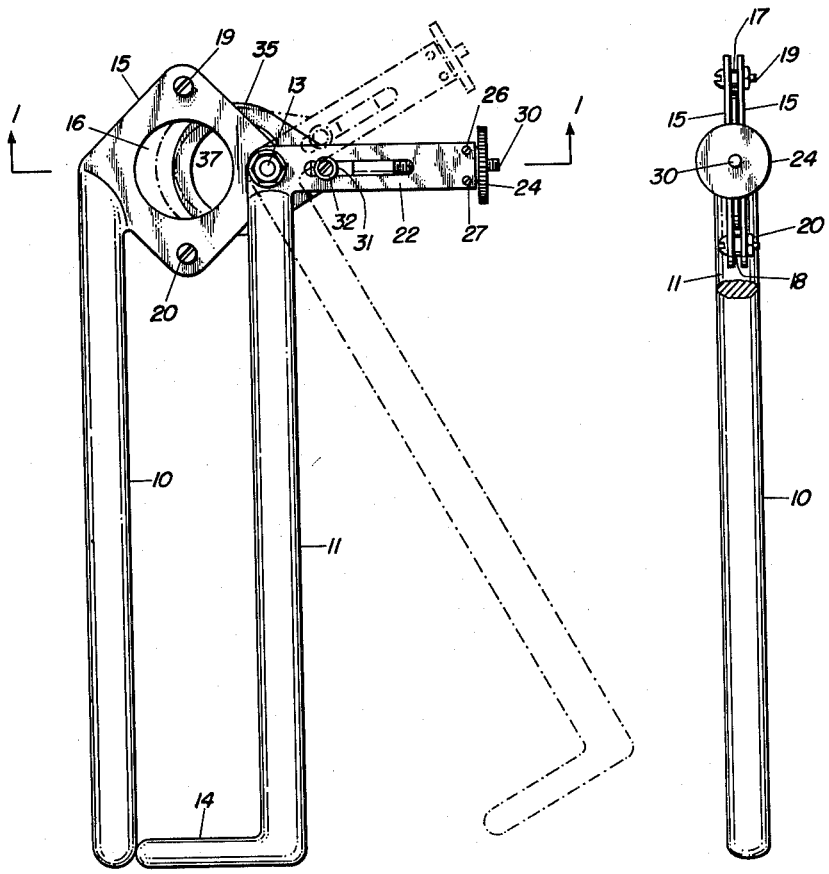
INVENTOR.
DOUGLAS D. RAZE
BY Everett J. Schroeder
Kenneth D. Siegfried
HIS ATTORNEYS United States Patent Office 3,164,899
Patented Jan. 12, 1965

3,164,899
COMPRESSION TYPE TOOL
Douglas D. Raze, 1220 Plymouth Ave. N.,
Minneapolis, Minn.
Filed July 11, 1961, Ser. No. 128,926
11 Claims. (Cl. 30—92)

This invention relates to the field of tools for manipulating rod or tube-like articles and more particularly relates to a tool for cutting or clamping the articles.

Numerous tools have been devised for working with pipe, rods, tubes and other such articles but are generally restricted to a type of tool which performs a singular function, that is, either gripping or clamping the material or cutting the material. My invention is specifically advantageous for use with rod-like articles or articles having a circular or substantially circular cross section. My invention will take on many forms and may be applied to the task of cutting bolts, dehorning cattle, removing the insulating cover from electric cables such as coaxial cables, as well as the task of gripping or clamping pipes and rods when used as a wrench or vise-like structure. In fact, the tool may have interchangeable manipulating members so that a cutting blade or clamping blade may be inserted into the tool to perform the function desired. The tool is also adjustable so that articles having different cross sectional areas may be clamped or severed with the same tool.

Stated briefly, my invention contemplates a tool having two or more gripping or cutting edges, one of which is adjustable from a pivot point and the cutting or clamping operation is performed by applying force to a pair of lever arms which are attached by linking members to that portion of the tool forming the cutting or gripping edges.

It is therefore a general object of the present invention to provide novel and improved apparatus in the form of a tool for manipulating rod or tube like articles;

It is a more specific object of the present invention to provide a novel and improved tool having work engaging edges which may be used for cutting or clamping rod or tube like articles;

It is yet another object of the present invention to provide a novel tool for twisting or rotating the articles to be gripped or severed to increase the clamping or cutting action;

It is yet a further object of the preesnt invention to provide novel and improved means in a cutting tool where the force necessary to operate the cutting tool decreases as the cutting operation starts;

It is yet another object of the present invention to to provide novel and improved means in a cutting force or clamping force for cutting or clamping the articles increases as the function to be performed progresses;

It is yet another object of the present invention to provide a novel and unique cutting tool wherein the clamping edges or cutting edges of the tool are interchangeable; and It is still a further object of the present invention to provide a novel and improved cutting tool where the article may be inserted alternately in different positions to increase the cutting capacity of the tool.

These and other features of the present invention will become more apparent from the appended specification and drawings in which like reference numerals refer to like parts in the drawings and in which:

FIGURE 1 is a cross sectional view of one embodiment of the invention employed as a hand tool taken along section lines shown in FIGURE 2;

FIGURE 2 is an elevation view of the hand tool taken along section lines 1—1; and FIGURE 3 is an end view of the tool shown from the right side with the nearest lever arm shown in broken section.

The tool, as shown in FIGURE 2, has a pair of lever arms 10 and 11, both of which pivot about a pair of bolts or studs 12 and 13. Also, lever arm 11 has a right angle extension 14 that cooperates with lever arm 10 when the two lever arms are substantially parallel. That is, extension 14 allows lever arm 11 to rotate until it is substantially parallel to lever arm 10. At the uppermost portion of lever arm 10 is a "U" shaped plate or plate-like bracket 15 which has an opening 16 formed in both faces of plate like member 15. U-shaped plate 15 is approximately the same length as lever arm extension 14 so that lever arms 10 and 11 are substantially parallel when extension 14 is in abutment with lever arm 10. It will of course be realized that U-shaped plate 15 may be made of singular structure material and in this event, bolts 12 and 13 would merely be one common pin or bolt. In order to provide rigidity to the plate 15, a pair of spacers 17 and 18 are situated in the slot of the U-shaped plate member 15 and are fixedly held in position by a pair of screws 19 and 20 respectively. It is also understood that for certain applications these spacers and screws or other suitable means may be omitted and as will be seen later provide more flexibility to the use of the tool. Lying parallel with plate like member 15 and fixedly attached to lever arm 11 is a pair of guide members 21 and 22 which are also secured about bolts or studs 12 and 13. Guide member 21 has a slot 23 formed in the center of the guide member and extending from a location adjacent bolt 12 outwardly towards an end portion supporting a nut 24. Guide member 22 has a slot 25 cut therein which extends from adjacent bolt 13 outwardly toward nut 24. At the end of guide members 21 and 22, located in a solid portion thereof, is a pair of screws 26 and 27 which secure guide members 21 and 22 in a position so that they support nut 24, but allow nut 24 to be rotated. This is accomplished by a groove 28 which is formed in the barrel part of nut 24 and screws 26 and 27 lie in the coacting part of groove 28 to hold nut 24 so that it is fixed axially with respect to guide members 21 and 22. Nut 24 has internal screw threads on the cylindrical central portion of the nut to engage a threaded arm 30 which extends laterally within the area formed by guide members 21 and 22 to a stirrup or U-shaped member 31 where it is fixedly attached thereto. U-shaped member 31 has a pair of holes formed therein which are parallel and opposite each other through which a bolt or machine screw 32 is passed and which also passes through a pair of washers 33 and 34. Located between washers 33 and 34 is a circular shaped member 35 which has one edge of its annular shape extended with a lobe 36 which has a hole formed therein so that bolt 32 passes therethrough and rotatably supports annular member 35 between washers 33 and 34. Bolt 32 also lies in slots 23 and 25 so that arm 30 adjusts the position of bolt 32 in guide slots 25 and 23. The circular member 35 has an opening 37 formed in its center to make it annular shaped.

Depending upon the operation to be performed, the work engaging edges of plate member 15 which are situated in opening 16 nearest bolt 13 are either sharpened to provide a cutting edge or have some form of serrations or knurling placed thereon to form a better gripping edge to improve the clamping qualities of the tool. In like manner, the work engaging edge of annular member 35 that is situated in opening 37 which is furthest from pivotal bolt 32 is also sharpened to provide a cutting edge for a cutting operation and is either knurled or has some other form of gripping edge applied thereto to engage the article being manipulated.

For certain cutting operations it may be desirable to have only the inner edge of annular member 35 sharpened and allow plate member 15 to have the knurled or gripping edges bear against the material to be severed.

In operation, let it first be assumed that the compression type tool is to be used to perform a clamping operation. With lever arms 10 and 11 in the position shown in FIGURE 2, nut 24 is adjusted to move arm 30 and thereby move clamping element 35 towards nut 24. Therefore, the opening between annular member or clamping element 35 and U-shaped plate or clamping element 15 is reduced in size and it is reduced to the point where it is somewhat smaller than the cross sectional area of the article to be clamped. Lever arm 11 is then rotated in a counter-clockwise movement as seen in FIGURE 2 and in so doing, clamping element 35 is moved laterally to the left so that openings 16 and 37 are somewhat larger than the cross sectional area of the article to be clamped. Thus the article to be clamped may be inserted in the openings which form the clamping or gripping edges. Once the article to be clamped is inserted in between clamping elements 35 and 15, lever arm 11 is rotated clockwise and it will be seen that the second pivot point containing screw 32 is rotated from a first position adjacent the clamping edge of clamping member 15 to an ever-increasing length away from the clamping edge of clamping member 15. Thus as clamping member 35 is rotated and drawn towards the clamping edge of clamping member 15, the force applied to the article to be clamped is increased and it will be seen that clamping member 35 also imparts a rotating motion or action to the article to thoroughly imbed the gripping edges in the edges of the article being clamped. Furthermore, it will be seen that as the second pivot point designated as bolt 32 moves away from clamping element 35 that the mechanical advantage gained by the distance between bolts 13 and 32 causes a greater force to bear on the article to be clamped while less force need be applied to lever arms 10 and 11. In other words, the mechanical advantage between pivot point 32 and the gripping edges of clamping elements 35 and 15 increases as lever arm 11 is rotated and this is in direct opposition to the operation of most pliers or other gripping devices.

Using my tool as a cutting device, annular member 35 will have a cutting edge on the concave inner surface and as shown in FIGURE 1, where only a single cutting edge is to be used, plate 15 will have its inner edges used only to support the article to be cut and will not have a sharp edge formed thereon. Using this embodiment, the tool is placed in the position as shown in FIGURE 2 and nut 24 is adjusted until the opening 37 in annular cutting plate 35 is no longer seen in opening 16 of plate 15. In other words, cutting blade 35 is drawn to the right until the cutting blade is drawn slightly past the inner concave edge of plate member 15. Handle or lever arm 11 is then rotated counterclockwise until the two openings 16 and 37 are somewhat superimposed and the article to be cut is then placed in the opening and handle 11 is rotated clockwise. As explained in the clamping operation, the further lever arm 11 is rotated towards parallelism with lever arm 10 the force required to rotate lever arm 11 becomes increasingly less as the cutting action progresses.

For some embodiments of my tool, it may be more advantageous to use only a single plate 15 and therefore may be desirous to put a wedge shaped cutting edge on annular member 35 as well as plate member 15 so that the two cutting edges work together as lever arm 11 is rotated.

For other embodiments of my invention, it may be desirous to include the elements such as guide members 21 and 22 and arm 30 along with nut 24 in the lever arm 11 or actually make lever arm 11 encompass or enclose the parts just mentioned. In that event, lever arm 10 would then be situated near screw 20 so that the two arms could be operated in parallelism during one of the article manipulating actions.

Another feature of my invention is that annular member 35 may be replaceable quite easily and thereby actually provide two tools in one, that is, one for cutting and the other for clamping rod-like or tubular articles. Furthermore, for certain applications, screws 19 and 20 may be removed so that annular member 35 may be rotated out of cooperating engagement with plate 15 for easy replacement.

For another embodiment, it may be desirable to mount plate member 15 to a solid base and drive lever arm or guide members 21, 22 by some reciprocating means such as a hydraulic piston or other mechanical means and in this case, it will be seen that when lever arm 11 is rotated counterclockwise, annular member 35 has its opening 37 exposed through opening 16 so that an article may be inserted therebetween for a cutting operation and as lever arm 11 is rotated clockwise to the relative position with respect to plate 15 as shown in FIGURE 2, the article would then be severed. Upon further rotation in a clockwise direction, lever arm 11 would again expose opening 37 through opening 16 and allow another article to be inserted. Upon rotation of lever arm 11 in a counterclockwise direction the article then would again be severed upon reaching the relative position as shown in FIGURE 2. On being rotated to the dotted line position as shown, opening 37 would again be exposed within opening 16 and a new article could be inserted and the cycle repeated.

It will be readily appreciated that my tool can be put to use to distinct advantage in many different ways. For example, my tool can be utilized to hold a patient's head immobile during a medical operation. Many other uses can be readily visualized. It will also be readily seen that any attempt to move the piece of work being held by my tool when the lever arms thereof extend parallel to each other, will automatically increase the compression force between the work-engaging members and the piece of work without requiring any increase in force upon the lever arms.

While I have shown a particular embodiment of my invention, I intend to cover all modifications, variations, and changes which may be made by those skilled in the art, in the appended claims, and intend to be limited only by the spirit and scope of these claims.

I claim:

1. A compression-type tool comprising: a first member having work-engaging surfaces facing in one direction, a second member overlying said first member and constructed and arranged in cooperative work-engaging relation with said first member and having a cooperating work-engaging surface facing in the opposite direction and movable past the work-engaging surface of said first member to cooperatively engage a piece of work, and pivot structure pivotally connecting said two members at a fixed point behind the work-engaging surface of said first member to cause their work-engaging surfaces to move toward and away from each other, said second member being pivotally mounted on said pivot structure at a point located farther behind the work-engaging surface of said first member than said fixed pivotal point for pivotal movement relative to the other of said members and relative to said pivot structure, the axes of each of said pivotal movements being spaced and parallel to each other and means carried by said pivot structure permitting movement of said member mounted on said pivot structure to change the spacing between the axes of said pivotal movements.

2. The invention as set forth in claim 1 wherein the work-engaging surface of at least one of said first and second members is sharpened to form a cutting edge so that a cutting function is performed when said members are pivoted.

3. The invention as set forth in claim 1 wherein the work engaging surfaces of said first and second members have a pair of gripping edges formed thereon so that articles to be clamped are rotatably urged into clamping engagement with said surfaces as said members are pivoted.

4. The invention as set forth in claim 2 wherein said members are reciprocally rotated back and forth with respect to each other so that articles may be inserted between said work engaging surfaces when said work engaging surfaces are separated and severed when said surfaces are moved toward each other to a position where they are at least in confronting relation.

5. A compression type cutting tool comprising: a plate having a concave edge, and a first pivotal member perpendicular to said plate located behind and in spaced relation from said concave edge, said plate including a first handle extension; a cutting blade having a concave cutting edge disposed opposite to, and overlying, said concave edge of said plate and pivoting about an axis parallel to said first pivotal member located in front of, and in spaced relation from said concave cutting edge; a second handle rotatable about said first pivotal member having a slot formed therein radially aligned from said first pivotal member, said second handle cooperating with said first handle to move said cutting blade with respect to said plate thereby performing a cutting operation; and an arm adjustable in length supported by said second handle having a pin for pivotally connecting said cutting blade about said axis to said second handle within said slot, said arm length determining the spaced relationship between said concave edges of said plate and said cutting blade.

6. A compression type clamping tool comprising: a first clamping element having a concave gripping edge, and a first pivotal member substantially perpendicular thereto located behind and in spaced relation from said concave edge, said first clamping element including a first handle extension; a second clamping element having a concave gripping edge disposed opposite to, and overlying, said concave gripping edge of said first clamping element and pivoting about an axis parallel to said first pivotal member located in front of, and in spaced relation from said concave gripping edge of said second clamping element; a second handle rotatable about said first pivotal member having a slot formed therein radially aligned from said first pivotal member, said second handle cooperating with said first handle to move said gripping edge of said second clamping elements towards said gripping edge of said first clamping element thereby performing a clamping operation; and an arm adjustable in length supported by said second handle having a pin for pivotally connecting said second clamping element about said axis to said second handle within said slot, said arm length determining the spaced relationship between said concave gripping edges of said first and second clamping elements.

7. A compression tool for manipulating rod or tube-like articles comprising: a first blade having a cutting edge and a first axis of rotation perpendicular to said blade and located behind and in spaced relation from said cutting edge, said first blade having a first lever arm attached thereto to receive a first force at a first length from said axis of rotation for rotating said blade; a second blade having a cutting edge, and a second axis of rotation parallel to but generally farther behind, said first axis of rotation, said cutting edge of said second blade being located in front of, and a variable length from said cutting edge of said first blade, said first and second blades overlying and facing each other in cooperating relation; a second lever arm having a pivotal support at said first axis of rotation for receiving a second force substantially equal and opposite to said first force at a second length from said first axis of rotation; and a member adjustable to a predetermined third length attached to said second lever arm and having a pair of pivotal supports disposed from each other, said pivotal supports determining the axes of rotation of said blades, and said member cooperating with said first and second axes so that said variable length decreases and said first and third lengths effectively increase as said first and second lever arms are rotated towards relative positions where said variable length is at least zero.

8. A compression type tool for manipulation of rod-like articles comprising: first means having an opening therein for encompassing and engaging a rod-like article, and having a lever portion located in spaced relation from said opening and from a first axis of rotation oriented substantially parallel to such a rod-like article when the latter is so encompassed; second means pivotally supported about said first axis of rotation of said first means comprising a bracket having a guide slot formed therein and an adjustable length arm parallel to said slot and supported by said bracket; third means having an opening therein for encompassing and engaging such a rod-like article, and having a second axis of rotation parallel to said first axis of rotation located in spaced relation from said first axis, but in a general direction and at a greater distance from said lever portion of said first means, said third means constructed and arranged to slidably and rotatably cooperate with said first means; pivotal coupling means for coupling said third means about said second axis of rotation to said adjustable length arm within said guide slot in said second means; and lever means fixedly attached to said second means to pivot said second means and said third means about said first axis of rotation so that such rod-like articles are increasingly compressed between said first means and said third means upon said lever means and said lever portion of said first means being rotated towards relative positions until said second axis of rotation is farthest from such articles.

9. A compression type tool for manipulation of rod-like articles comprising: first means having an opening therein for encompassing and engaging a rod-like article, and having a lever portion located in spaced relation from said opening and from a first axis of rotation oriented substantially parallel to such a rod-like article when the latter is so encompassed; bracket means pivotally supported about said first axis of rotation of said first means comprising a member having a guide slot formed therein and an adjustable length arm parallel to said slot and supported by said bracket; second means having an opening therein for encompassing and engaging such a rod-like article, and having a second axis of rotation parallel to said first axis of rotation located in spaced relation from said first axis, but in a general direction and at a greater distance from said lever portion of said first means, said second means constructed and arranged to slidably and rotatably cooperate with said first means; pivotal coupling means for coupling said second means about said second axis of rotation to said adjustable length arm within said guide slot in said bracket means; and lever means fixedly attached to said bracket means at right angles to said member to pivot said bracket means and said second means about said first axis of rotation so that such rod-like articles are increasingly compressed between said first means and said second means upon said lever means and said lever portion of said first means being rotated towards relative positions until said second axis of rotation is farthest from such articles.

10. A compression type tool for manipulation of rod-like articles comprising: a first member having an opening therein for encompassing and engaging a rod-like article, and having a lever portion located in spaced relation from said opening and from a first axis of rotation oriented substantially parallel to such a rod-like article when the latter is so encompassed; a second member pivotally supported about said first axis of rotation of said first member comprising a bracket having a guide slot formed therein; an adjustable length arm parallel to said slot and supported by said bracket having screw means for adjusting its length and having a bore therein parallel to said first axis of rotation; a third member having an opening therein for encompassing and engaging such a rod-like article, and having a second axis of rotation parallel to said first axis of rotation located in spaced relation from said first axis, but in a general direction and at a greater distance from said lever portion of said first means, said third member constructed and arranged to slidably and rotatably cooperate with said first member; a pin passing through said third member about said second axis of rotation and through said bore of said adjustable length arm but sliding within said guide slot in said second member; and a lever fixedly attached to said second member to pivot said second member and said third member about said first axis of rotation so that such rod-like articles are increasingly compressed and rotated between said first member and said third member upon said lever and said lever portion of said first member being rotated towards relative positions until said second axis of rotation is farthest from such articles.

11. A compression type tool for manipulation of rod-like articles comprising: a first means having an opening therein for encompassing and engaging a rod-like article, and having a lever portion located in spaced relation from said opening and from a first axis of rotation oriented substantially parallel to such a rod-like article when the latter is so encompassed; a second means having an opening therein for encompassing and engaging such a rod-like article, and having a second axis of rotation parallel to said first axis of rotation located in spaced relation from said first axis, but in a general direction and at a greater distance from said lever portion of said first means, said second means constructed and arranged to slidably and rotatably cooperate with said first means; third means pivotally supported about said first axis of rotation of said first means comprising bracket means having guide means formed therein; adjustable arm means aligned with said guide means and supported by said bracket and having pivotal coupling means for coupling said second means to said third means through said guide means; and lever means fixedly attached to said third means to pivot said third means and said second means about said first axis of rotation so that such rod-like articles are increasingly compressed and rotated between said first means and said second means upon said lever means and said lever portion of said first means being rotated towards relative positions until said second axis of rotation is farthest from such articles.

References Cited by the Examiner
UNITED STATES PATENTS

| | | | |
|---|---|---|---|
| 338,326 | 3/86 | Wilson | 81—382 |
| 372,080 | 10/87 | Mitchell | 7—5.4 |
| 432,663 | 7/90 | Fields | 30—253 |
| 1,092,050 | 3/14 | Hosier | 81—384 X |
| 1,114,649 | 10/14 | Reed | 81—384 X |
| 1,208,694 | 12/16 | Swickard | 81—390 X |
| 1,290,581 | 1/19 | Kozbial | 30—92 X |
| 1,561,681 | 11/25 | Barnes | 81—384 |
| 1,573,409 | 2/26 | Lynch et al. | 81—94 X |
| 1,706,411 | 3/29 | Pfaff | 81—69 |
| 1,753,225 | 4/30 | Walter | 30—238 |
| 1,890,908 | 12/32 | Layton | 81—92 X |
| 2,659,142 | 11/53 | Fender | 30—245 |
| 2,729,127 | 1/56 | Watanabe | 81—362 X |
| 2,795,982 | 6/57 | Mathias. | |
| 3,026,613 | 3/62 | Nielson | 30—245 |

FOREIGN PATENTS 89,784 12/58 Netherlands.

WILLIAM FELDMAN, *Primary Examiner.*

WALTER A. SCHEEL, MILTON S. MEHR,
*Examiners.*